United States Patent [19]

Marquardt et al.

[11] 4,336,172
[45] Jun. 22, 1982

[54] AQUEOUS DISPERSIONS OF CROSS-LINKABLE COPOLYMERS BASED ON (METH)ACRYLATES, THEIR PREPARATION AND USE AS STOVING ENAMELS

[75] Inventors: Klaus Marquardt; Herbert Eck; Werner Bathelt, all of Burghausen, Fed. Rep. of Germany

[73] Assignee: Wacker-Chemie GmbH, Munich, Fed. Rep. of Germany

[21] Appl. No.: 158,468

[22] Filed: Jun. 11, 1980

[30] Foreign Application Priority Data

Jul. 2, 1979 [DE] Fed. Rep. of Germany ....... 2926631

[51] Int. Cl.$^3$ ............................................. C08L 31/02
[52] U.S. Cl. .................................... 524/555; 526/320; 524/561; 524/820; 524/828; 524/831; 524/833
[58] Field of Search ................. 260/29.6 T, 29.6 TA; 526/320

[56] References Cited

U.S. PATENT DOCUMENTS 4,245,076  1/1981  Marquardt .......................... 526/320

Primary Examiner—Harry Wong, Jr.
Attorney, Agent, or Firm—Hammond & Littell, Weissenberger and Muserlian

[57] ABSTRACT

Aqueous dispersions containing from 30% to 70% by weight of cross-linkable copolymers based on esters of (meth)acrylic acid comprising esters of (meth)acrylic acid and/or styrene, and other ethylenically-unsaturated compounds copolymerizable therewith and from 1% to 15% by weight based on the total weight of the copolymer, of allyl esters of α-hydroxycarboxylic acids. These dispersions can be used as a base of stoving enamels, which can be hardened to obtain coats of great surface hardness and great flexibility on metals.

5 Claims, No Drawings

AQUEOUS DISPERSIONS OF CROSS-LINKABLE COPOLYMERS BASED ON (METH)ACRYLATES, THEIR PREPARATION AND USE AS STOVING ENAMELS

BACKGROUND OF THE INVENTION

The invention concerns aqueous dispersions of copolymers based on (meth)acrylic acid derivatives, their preparation and use, for example, in the production of thermosetting or stoving enamels. Enamels produced this way yield coats of increased surface hardness, with increased elasticity, extensibility and substrate adhesion.

It is known that aqueous dispersions of (meth)acrylic ester copolymers, which contain, optionally, other monomer units derived, for example, from styrene, and which are thermosettable by the incorporation of comonomers containing hydroxyl groups, such as hydroxypropyl methacrylate, and by the addition of a cross-linking agent, like hexamethoxymethyl melamine, can be used as binders for stoving enamels. Enamels containing these binders frequently have a high surface hardness, but they are generally either extremely brittle, or they are flexible so that the undercoat can still be deformed, for example, without the enamel chipping off, but their surface hardness is then insufficient.

OBJECTS OF THE INVENTION

An object of the present invention is therefore to provide aqueous dispersions of copolymers which are particularly suitable for use as binders for stoving enamels which yield coats of improved surface hardness and increased flexibility.

Another object of the present invention is the obtaining of an aqueous dispersion containing from 30% to 70% by weight of a cross-linkable copolymer based on (meth)acrylic acid and its derivatives, said cross-linkable copolymers consisting essentially of monomer units of (meth)acrylic acid and/or its derivatives, other ethylenically-unsaturated compounds copolymerizable therewith, and from 1% to 15% by weight of the total weight of said copolymers, of monomer units of the formula:

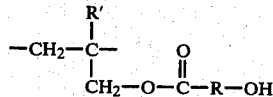

wherein R represents a straight-chained alkylene having 2 to 10 carbon atoms, optionally substituted with up to three methyl and/or ethyl groups, and R' represents a member selected from the group consisting of hydrogen and methyl, where the hydroxy group is linked to a carbon atom having at least one hydrogen attached thereto.

A further object of the present invention is the development of a process for the production of the above aqueous dispersion.

A yet further object of the present invention is the development of a stoving enamel comprising the aforesaid aqueous dispersion and a cross-linking agent.

These and other objects of the present invention will become more apparent as the description thereof proceeds.

DESCRIPTION OF THE INVENTION

The drawbacks of the prior art were overcome and the above objects were achieved by the development of aqueous dispersions containing from 30% to 70% by weight, based on the total weight of the dispersion, of copolymers of (meth)acrylic acid and/or its derivatives and, optionally, other ethylenically-unsaturated compounds that are copolymerizable therewith, as well as customary additives. These dispersions are characterized in that the copolymers contain from 1% to 15% by weight, based on the total weight of the copolymers, of units of the general Formula I:

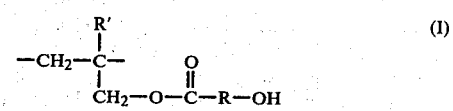

where
R = straight-chained hydrocarbon radicals with 2 to 10 carbon atoms, which can be substituted, if necessary, by up to three methyl and/or ethyl radicals;
R' = H or CH$_3$
and where the hydroxy group is linked to a carbon atom of the radical R to which at least one additional hydrogen is linked directly.

More particularly, the present invention relates to an aqueous dispersion containing from 30% to 70% by weight of a cross-linkable copolymer based on (meth)acrylic acid and its derivatives, said cross-linkable copolymers consisting essentially of monomer units of (meth)acrylic acid and/or its derivatives, other ethylenically-unsaturated compounds copolymerizable therewith, and from 1% to 15% by weight of the total weight of said copolymers, of monomer units of the formula:

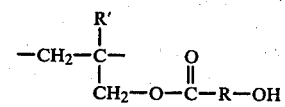

wherein R represents a straight-chained alkylene having 2 to 10 carbon atoms optionally substituted with up to three methyl and/or ethyl groups, and R' represents a member selected from the group consisting of hydrogen and methyl, where the hydroxy group is linked to a carbon atom having at least one hydrogen attached thereto.

The dispersions according to the invention can be prepared by emulsion polymerization in the presence of customary initiators forming free radicals and/or catalysts and, optionally, customary additives where a monomer mixture, dispersed in the aqueous phase, is copolymerized which contains from 1% to 15% by weight, based on the total weight of the comonomers, of compounds of the general Formula II:

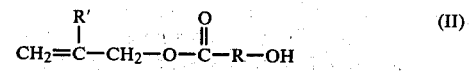

wherein R and R' have the same meaning as in Formula I.

More particularly, the process of the invention is a process for the production of the above aqueous dispersions consisting essentially of the steps of polymerizing, under polymerizing conditions, an aqueous dispersion containing from 30% to 70% by weight of said dispersion of monomers selected from the group consisting of (meth)acrylic acid and/or its derivatives, other ethylenically-unsaturated compounds copolymerizable therewith and from 1% to 15% by weight of said monomers of (meth)allyl esters of the formula:

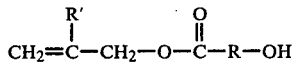

wherein R represents a straight-chained alkylene having 2 to 10 carbon atoms, optionally substituted with up to three methyl and/or ethyl groups, and R' represents a member selected from the group consisting of hydrogen and methyl, where the hydroxyl group is linked to a carbon atom having at least one hydrogen attached thereto, and recovering said aqueous dispersion containing from 30% to 70% by weight of cross-linkable copolymers.

Suitable monomers, in addition to the compounds of Formula II, for the preparation of the dispersions according to the invention, are particularly derivatives of acrylic acid and of methacrylic acid, like alkyl esters having from 1 to 18 carbon atoms in the alkyl of (meth)acrylic acid, and styrene. The term "(meth)acrylic acid" relates to both methacrylic acid and acrylic acid. The term "(meth)allyl" relates to both allyl and methallyl. The mention of acrylic acid derivatives generally also applies to methacrylic acid derivatives.

The preferred aqueous dispersions contain copolymers which are composed of:
(a) from 30% to 70% by weight of monomer units selected from the group consisting of alkyl (meth)acrylates or styrene which form homopolymers with a high glass transition temperature, particularly a glass transition temperature of 80° C. or over,
(b) from 19% to 69% by weight of monomer units selected from the group consisting of alkyl (meth)acrylates which form homopolymers with a low glass transition temperature, particularly a glass transition temperature of 10° C. or less,
(c) from 0 to 20% by weight of monomer units of other ethylenically-unsaturated monomers, and
(d) from 1% to 15% by weight of monomer units of the general Formula I, all weights based on the total weight of the copolymers.

These preferred dispersions are prepared by polymerization in an aqueous emulsion, as described above, of a monomer mixture of 30% to 70% by weight of monomers which yield in the polymerization the units described under (a), 19% to 69% by weight of monomers which yield the units described under (b), 0 to 20% by weight of additional monomers yielding the units described under (c), and 1% to 15% by weight, based on the total weight of the monomer mixture, of the compounds of the general formula II, described under (d).

Suitable monomers which yield homopolymers with a high glass transition temperature ($T_g$ equal to or greater than 80° C.) are, for example, alkyl esters with alkyl radicals of 1 to 4 carbon atoms of methacrylic acid, particularly methyl methacrylate, ethyl methacrylate, propyl methacrylate and the butyl methacrylates, but also styrene.

Suitable monomers which yield homopolymers with a low glass transition temperature ($T_g$ equal to or less than 10° C.) are, for example, alkyl esters with alkyl radicals of 1 to 8 carbon atoms of acrylic acid, particularly butyl acrylate and octyl acrylate.

Other suitable ethylenically-unsaturated monomers which are or can be polymerized up to 50% by weight, preferably up to 20% by weight, into the copolymers according to the invention are, for example, (meth)acrylic acid and its salts, (meth)acrylamide, (meth)acrylonitrile, N-methylol (meth)acrylamide and its derivatives, for example, etherified with customary alkyl radicals, N-vinyl-2-pyrrolidone, N-vinyl lactams, butadiene, isoprene, divinylbenzene, vinyl esters of saturated carboxylic acids, particularly vinyl lower alkanoates, such as vinyl acetate, vinyl and vinylidene halides, ethylene, unsaturated dicarboxylic acids, like maleic acid, fumaric acid, and itaconic acid, as well as their salts, their (half) esters and their (half) amides.

The concentration of these other ethylenically-unsaturated monomers in the monomer mixture or the units in the copolymer derived therefrom preferably do not exceed 3% by weight, based on the total copolymer weight.

More particularly, therefore, the present invention involves an aqueous dispersion containing from 40% to 60% by weight of a cross-linkable copolymer having:
(a) from 30% to 70% by weight of said copolymer of monomer units which form homopolymers having a glass transition temperature of 80° C. or higher selected from the group consisting of alkyl esters with alkyl having from 1 to 4 carbon atoms of methacrylic acid and styrene,
(b) from 19% to 69% by weight of said copolymer of monomer units which form homopolymers having a glass transition temperature of 10° C. or lower selected from the group consisting of alkyl esters with alkyl having from 1 to 8 carbon atoms of acrylic acid,
(c) from 0 to 20% by weight of said copolymer of monomer units of other monomers selected from the group consisting of (meth)acrylic acid and its salts, (meth)acrylamide, (meth)acrylonitrile, N-methylol-(meth)acrylamide, N-alkoxymethyl-(meth)acrylamide, N-vinyl-2-pyrrolidone, N-vinyl-lactams, butadiene, isoprene, divinylbenzene, vinyl lower alkanoates, vinyl halides, vinylidene halides, ethylene, alkenedioic acids having from 4 to 8 carbon atoms, their salts, mono-lower alkyl esters, di-lower alkyl esters, monoamides and diamides, and
(d) from 1% to 15% by weight of said copolymer of monomer units of (meth)allyl esters of the formula

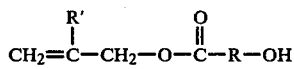

wherein R represents a straight-chained alkylene having 2 to 10 carbon atoms, optionally substituted with up to three methyl and/or ethyl groups, and R' represents a member selected from the group consisting of hydrogen and methyl, where the hydroxy group is linked to a carbon atom having at least one hydrogen attached thereto.

The units of Formula I are derived from the (meth)allyl esters of Formula II, preferably from (meth)allyl α-hydroxyalkanoates. These compounds and their preparation are disclosed in the published German Application P 28 22 436, which corresponds to commonly assigned U.S. patent application Ser. No. 37,749, filed May 10, 1979, now U.S. Pat. No. 4,245,076. Therein is disclosed a process of reacting (meth)allyl alcohol with the free ω-hydroxycarboxylic acids or the lactones derived therefrom in the presence of acid catalysts, such as sulfuric acid, p-toluene sulfonic acids and acid ion-exchangers.

The following examples of preferred compounds of Formula II are mentioned:

the allyl and methallyl esters of
5-hydroxyvaleric acid,
6-hydroxycaproic acid,
6-hydroxymethylcaproic acid,
6-hydroxydimethylcaproic acid,
7-hydroxyenantic acid, and
11-hydroxyundecanoic acid.

The copolymers contained in the dispersions according to the invention have preferably K-values (according to Fikentscher) of about 40 to 140, particularly about 60 to 120.

Particularly preferred are dispersions which contain 40% to 60% by weight of these copolymers, which are composed, based on the total weight of the copolymers, of:

(a) 50% to 60% by weight of monomer units derived from from methyl methacrylate or styrene,
(b) 24% to 47% by weight of monomer units derived from butyl acrylate,
(c) 0 to 3% by weight of monomer units derived from acrylic acid and/or acrylamide, and
(d) 3% to 13% by weight of monomer units derived from allyl 6-hydroxycaproate.

For the preparation of these particularly preferred dispersions, the above-mentioned monomers are polymerized under free-radical polymerization conditions in an aqueous emulsion in the percentages indicated for the copolymer composition.

The polymerization for the preparation of the aqueous dispersions according to the invention is effected according to the generally known methods of emulsion polymerization with water as the second phase, using customary additives, like emulsifiers and, optionally, protective colloids, as well as initiators and/or catalysts, and, optionally, reducing agents or activators and buffer substances.

It is possible to charge the reaction mixture with the exception of the initiators, catalysts, reducing agents and/or activators, jointly and to start the polymerization by adding these free-radical-supplying components.

Frequently it is more advantageous to add gradually to a charge of water, emulsifier and, optionally, protective colloids, the total amount or a part of the monomers and/or of the free-radical supplying components during the polymerization.

Naturally it is also possible to charge individual monomers, and to add the other monomers gradually, or to proceed in the reverse order. In particular, it was found expedient in many cases to charge the total amount or a major part of the (meth)allyl ester of the hydroxycarboxylic acid in mixture with a smaller portion of the other monomers, and to add the remaining amount of the monomers gradually during the polymerization.

The initiator system can naturally also be added at once, but frequently it is found of advantage to dose it over the polymerization period.

The same dispersion aids can be used in the preparation of the dispersions according to the invention which have been used heretofore in the preparation of aqueous dispersions of emulsion polymerization. Thus, for example, ionic and nonionic emulsifiers can be used alone or together with protective colloids. Examples of ionic emulsifiers are particularly the anionic alkylsulfonic acids, arylsulfonic acids, alkarylsulfonic acids, and aralkylsulfonic acids, such as tetradecanesulfonic acid, as well as their salts, particularly with the metals of the first main group of the periodic system, or with ammonia or with amines.

Examples of nonionic emulsifiers are the addition products of ethylene oxide onto alkylphenols, fatty alcohols, fatty acids, fatty amines, etc.

Examples of protective colloids are fully or partly saponified polyvinyl acetate and cellulose derivatives, like methyl cellulose and hydroxyethyl cellulose.

The catalysts or initiators for the preparation of the dispersions according to the invention are the same substances that are generally used in emulsion polymerization, particularly compounds forming free radicals, like peroxide or azo compounds, such as ammonium or potassium peroxide or redox catalysts, which are composed of peroxide compounds and reducing agents as activators.

If necessary, buffer substances, like alkali metal bicarbonates, alkali metal phosphates, etc., can also be used.

The dispersion aids and the polymerization initiators and catalysts and buffer substances are used in the amounts customary in emulsion polymerization. The amount of the compounds forming free radicals is generally preferably in the range of from 0.001% to 1% by weight, based on the total weight of the comonomers; the amount of the dispersion agents is generally preferably in the in the range of from 0.1% to 10% by weight, based on the total weight of the comonomers.

The dispersions according to the invention can be used preferably for the production of thermosetting or stoving enamels. These stoving enamels are particularly suitable for coating solid surfaces, preferably metal objects, such as casings or parts of machines or refrigerators, since they yield coats of great surface hardness and do not chip off on impact stresses, due to their elasticity. Beyond that, these coats also are suitable for the "coil-coating" methods, since the shaping of the metal after the coating has practically no effect on the quality of the coat.

The thermosetting enamels are produced by adding in known manner to the dispersions according to the invention, pigments, dyes, fillers and, optionally, other customary aids, such as leveling aids, dispersion agents, wetting agents, aids to influence the rheological properties of the enamels, as well as by the addition of cross-linking agents.

The cross-linking agents, such as melamine resins, urea-formaldehyde resins, phenol-formaldehyde resins and blocked isocyanates, are added preferably in amounts of from 1% to 10%, particularly from 2% to 5%, by weight, based on the weight of the binder, hence of the copolymers contained in the dispersions according to the invention.

The pigments, dyes and/or fillers, as well as leveling aids, film-forming aids, dispersion agents, wetting agents and/or aids to influence the rheological properties used in customary amounts are those substances which have already been used in stoving enamels based on aqueous polymer dispersions.

Pigments or fillers, like metal oxides or metal sulfide compounds, carbon black, sulfates, silicates, chromates, or organic coloring pigments, metal powders, like aluminum, bronze, etc., talc, barite, kaolin, quartz, mica, diatomaceous earth, PVC powder, etc., are preferably used in amounts of from 0 to 100%, particularly from 20% to 80% by weight, based on the binder content.

The additional wetting and dispersion agents, like alkali metal metaphosphate and alkali metal polyphosphate compounds, can be used preferably in amounts of up to 2% by weight, based on the weight of the binders. The leveling and film-forming agents, like polyhydric alcohols, high-boiling hydrocarbons, particularly aromates, and high-boiling esters, can be used preferably in amounts up to 10% by weight, particularly from 0 to 3% by weight, based on the binder, and aids to influence the rheological properties, like higher-boiling alcohols, can be used preferably in amounts of up to 20% by weight, based on the total weight of the dispersion.

The stoving enamels thus produced can be hardened at temperatures of 80° to 300° C., preferably at 100° to 200° C., if necessary under pressure. The required heating time is generally 5 to 60 minutes, but preferably not more than 30 minutes. The stoving time can be reduced by the use of suitable catalysts, such as acid compounds (toluene-sulfonic acid) with formaldehyde condensation products as cross-linking agents, or organic tin compounds (dibutyl tin dilaurate) with the use of blocked diisocyanates as cross-linking agents. With them, completely homogeneous coats which are resistant to most solvents are obtained.

The following examples illustrate the invention without being limitative.

EXAMPLES

Examples 1 to 5 illustrate the preparation of the dispersions according to the invention.

EXAMPLE 1

Into a two-liter glass vessel with stirrer and reflux condenser were charged: 330 gm of water and 9 gm of a 30% aqueous alkyl sulfonate solution (Mersolat ®K 30, Bayer AG), and heated to 80° C. After adjusting the solution to a pH value of 3.3, the following monomer emulsion was added within two hours at 80° C. under stirring:

| Amount in Grams | |
|---|---|
| 550.0 | Water |
| 4.5 | Mersolat ® K 30 (30%) |
| 4.5 | $K_2S_2O_8$ |
| 9.0 | Acrylic acid |
| 18.0 | Acrylamide |
| 495.0 | Methyl methacrylate |
| 350.0 | Butyl acrylate |
| 57.0 | Allyl 6-hydroxycaproate. |

Subsequently a pH of 8 was established with ammonia, and the polymerization was continued for one hour at 80° C. under stirring. The dispersion had then a solids content of 50.2% by weight and a viscosity of 765 mPa.s (Brookfield RVT-viscosimeter, 10 min$^{-1}$).

EXAMPLE 2

Example 1 was repeated but the parts by weight in the monomer emulsion were varied as follows for the last three monomers:

| Grams | |
|---|---|
| 540.0 | Methyl methacrylate |
| 250.0 | Butyl acrylate |
| 114.0 | Allyl 6-hydroxycaproate. |

EXAMPLE 3

Example 1 was repeated and the following changes were made in the monomer composition:

| | Grams | |
|---|---|---|
| Methyl methacrylate | 540.0 | (Instead of 495 grams) |
| Ethylhexyl acrylate | 305.0 | (Instead of butyl acrylate) |

EXAMPLE 4

Example 1 was repeated, but instead of 495 gm of methyl methacrylate, 495 gm of styrene were employed.

COMPARISON TEST A

Example 1 was repeated but instead of allyl 6-hydroxycaproate, the same molar amount of 2-hydroxypropyl methacrylate was employed. The monomer composition of the emulsion contains instead of the amounts indicated in Example 1:

| | Grams | |
|---|---|---|
| Butyl acrylate | 361.0 | (Instead of 350 gm) |
| 2-Hydroxypropyl methacrylate | 46.0 | (Instead of allyl 6-hydroxy caproate) |

EXAMPLE 5

The copolymer dispersions of Examples 1 to 4 and of Comparison Test A were mixed according to the following formula to a white glossy stoving enamel (Table 1).

TABLE 1

| Parts by Weight | Components |
|---|---|
| 100.0 | Copolymer dispersion (Examples 1 to 4 and Comparison Test A) |
| 8.0 | Hexamethoxymethyl melamine (25% in water/isopropanol 93:7) |
| 0.2 | Sodium metaphosphate (Calgon ® N, 10% in water) |
| 0.2 | Polyphosphate (dispersion agent PA 30, Hoechst AG) |
| 15.0 | Titanium dioxide Kronos ® RN 45 |
| 1.0 | Propylene glycol. |

The mixtures were applied in a thickness of 20 μm on Erichsen cupping plates (DIN 1624, Deutsche Industrienorm, German Industrial Standard) and stoved at 150° C. for ten minutes.

In all cases, firmly adhering glossy coats were obtained which were subjected to the tests listed in Table 2.

In addition, Table 2 contains values from the determination of the breaking elongation according to DIN 53 504. To this end, unpigmented films were produced and annealed for ten minutes at 150° C.

TABLE 2

| Dispersion from Example No. | 1 | 2 | 3 | 4 | Comparison Test 5 |
|---|---|---|---|---|---|
| Surface hardness according to Koenig (s) (DIN 53 157) | 137 | 166 | 105 | 162 | 97 |
| Breaking elongation (%) (DIN 53 504) | 330 | 140 | 370 | 130 | 130 |
| Ball impact test (inch-pound) (ASTM D 2749) | 70 | 2 | — | — | <2 |
| Erichsen cupping (mm) (DIN 53 156) | plate crack | plate crack | plate crack | plate crack | 8 |
| Mandrel bending text (mm) (DIN 53 152) | <2 | <2 | <2 | <2 | <2 |
| Degree of cross-linkage (%)* | >99 | >99 | >99 | >99 | >99 |

*Determined by extraction tests with boiling ethyl acetate.

These tests show that the stoving enamels of the invention had a higher surface hardness and good flexibility without loss of other properties.

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. An aqueous dispersion for use in stoving enamels containing from 30% to 70% by weight of a cross-linkable copolymer consisting essentially of:
    (a) from 30% to 70% by weight of said copolymer of monomer units of monomers giving homopolymers having a glass transition temperature of 80° C. or higher selected from the group consisting of alkyl esters with alkyl having from 1 to 4 carbon atoms of methacrylic acid and styrene,
    (b) from 19% to 69% by weight of said copolymer of monomer units of monomers giving homopolymers having a glass transition temperature of 10° C. or lower, said monomers being alkyl esters with alkyl having from 1 to 8 carbon atoms of acrylic acid,
    (c) from 0 to 20% by weight of said copolymer of monomer units of other monomers selected from the group consisting of (meth)acrylic acid and its salts, (meth)acrylamide, (meth)acrylonitrile, N-methylol-(meth)acrylamide, N-alkoxymethyl-(meth)acrylamide, N-vinyl-2-pyrrolidone, N-vinyl-lactams, butadiene, isoprene, divinylbenzene, vinyl lower alkanoates, vinyl halides, vinylidene halides, ethylene, alkenedioic acids having from 4 to 8 carbon atoms, salts of alkenedioic acids having from 4 to 8 carbon atoms, mono-lower alkyl esters of alkenedioic acids having from 1 to 8 carbon atoms, di-lower alkyl esters of alkenedioic acids having from 1 to 8 carbon atoms, monoamides of alkenedioic acids having from 1 to 8 carbon atoms, and diamides of alkenedioic acids having from 1 to 8 carbon atoms, and
    (d) from 1% to 15% by weight of said copolymers of monomer units of (meth)allyl esters of the formula

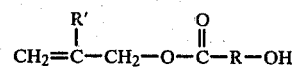

wherein R represents a straight-chained alkylene having 2 to 10 carbon atoms, optionally substituted with up to three methyl and/or ethyl groups, and R' represents a member selected from the group consisting of hydrogen and methyl, where the hydroxy group is linked to a carbon atom having at least one hydrogen attached thereto.

2. The aqueous dispersion of claim 1, wherein said cross-linkable polymer is present in an amount of from 40% to 60% by weight.

3. The aqueous dispersion of claim 1 wherein said component (d) is allyl 6-hydroxycaproate.

4. Aqueous thermosetting stoving comprising the aqueous dispersion of claim 1 and further containing:
    from 1% to 10% by weight of the copolymer content of said aqueous dispersion, of cross-linking agents, and
    from 0 to 100% by weight of the copolymer content of said aqueous dispersion, of pigments, fillers, or mixtures of pigments and fillers.

5. The aqueous dispersion for use in stoving enamels of claim 1 wherein said cross-linkable copolymer is present in an amount of from 40% to 60% by weight and consists essentially of
    (a) from 50% to 60% by weight of monomer units selected from the group consisting of methyl methacrylate and styrene,
    (b) from 24% to 47% by weight of butyl acrylate monomer units,
    (c) from 0 to 3% by weight of monomer units selected from the group consisting of acrylic acid and acrylamide, and
    (d) from 3% to 13% by weight of allyl 6-hydroxycaproate monomer units.

* * * * *